Dec. 14, 1926.
J. L. SCHMIDLING
1,610,617.
OIL GAUGE MOUNTING
Filed August 28, 1922
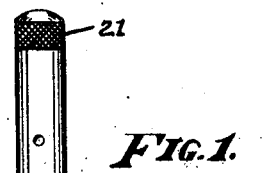
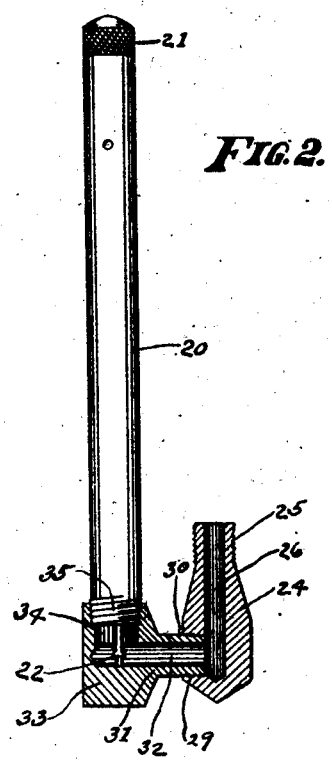
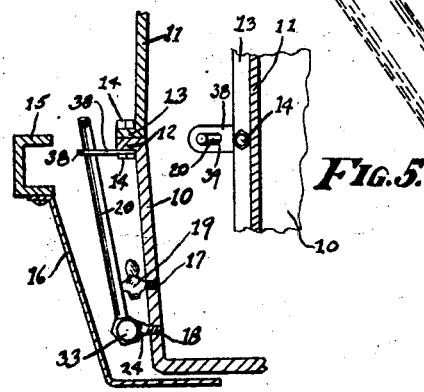
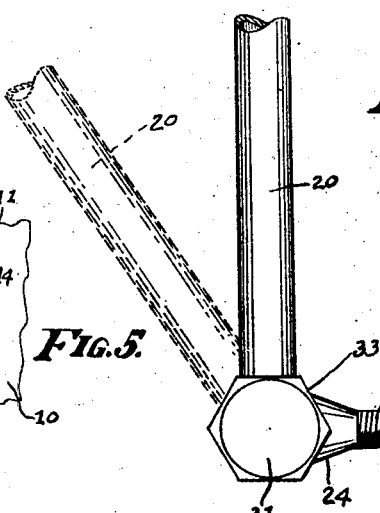
Joseph L. Schmidling
INVENTOR.
BY Erwin Wheeler & Woolard
ATTORNEYS Patented Dec. 14, 1926.

1,610,617

UNITED STATES PATENT OFFICE.

JOSEPH L. SCHMIDLING, OF MILWAUKEE, WISCONSIN, ASSIGNOR OF ONE-HALF TO EDWARD A. SPRAGG, OF MILWAUKEE, WISCONSIN.

OIL-GAUGE MOUNTING.

Application filed August 28, 1922. Serial No. 584,756.

This invention relates to improvements in oil gauge mountings. This application is a companion to my application relating to the same subject matter, filed July 8, 1922, Serial No. 573,695. Like the application above referred to, the subject matter of this application relates to a special fitting adapted for the mounting of an oil gauge of the type disclosed in my co-pending application, filed March 27, 1922, Serial No. 547,264.

The oil gauge referred to comprises a tubular well associated with the oil reservoir of an internal combustion engine and arranged to receive a gauge stick or rod which will indicate the level of oil in the reservoir by the extent to which oil adheres to the rod when the rod is withdrawn from the well. In my companion application, No. 573,695, I disclosed a fitting which was adaptable, by reason of its peculiar construction, to a great many different types of cars. Its adaptation, however, was rather closely limited by reason of the fact that it was entirely non-adjustable. I found that in many cars, even cars of a single make, the oil holes are bored at such a variety of angles that a device of the character shown in my above identified application can not meet the requirements. Accordingly, it is the primary object of this invention to provide an oil gauge mounting which will be extremely flexible in its adjustment so that the tubular element which comprises the well may be disposed at any angle necessary to meet the requirements of the particular motor with which it is associated.

It is a further important object of this invention to provide means for securing the device in adjustment at the desired angle, said means being such as to need no adjustment and to be readily accessible.

In the drawings:

Figure 1 is a side elevation of a tubular oil gauge attached to a fitting embodying this invention, one portion of the fitting being inclined away from the observer.

Figure 2 is a similar view, the fitting being shown in a section taken on planes including the axes of the ducts therethrough.

Figure 3 is a view of the device shown in Figures 1 and 2, taken at 90° from said figures and illustrating the tubular body of the oil gauge in different positions of adjustment with reference to that portion of the fitting which is attached to the crank case of the motor.

Figure 4 is a view upon a reduced scale showing in side elevation the application of a fitting embodying this invention to a motor crank case.

Figure 5 is a detail view in plan of bracing means shown in Figure 4.

Like parts are identified by the same reference characters throughout the several views.

At 10 in Figure 4 is represented the lower portion of the crank case of a motor vehicle. 11 represents the upper portion thereof, and it will be noted that the two portions 10 and 11 are provided with abutting flanges 12 and 13, secured together by a suitable bolt or stud and nut 14. It is not intended to represent any particular internal combustion engine. The showing of Figure 4 should rather be understood to be diagrammatic. It is a fact, however, that a large number of automobile motors of modern design are provided with the flanges 12 and 13 between upper and lower crank case members, said flanges being secured together in the manner indicated.

A portion of the vehicle frame is shown in section at 15, and 16 represents the under pan. The crank case in many motors is provided with openings 17 and 18 into drain cocks of the type shown at 19 and are ordinarily inserted to serve as means for testing the level of oil within the crank case. Such drain cocks, however, being disposed in narrow quarters between the crank case and the under pan 16, are very inaccessible and are generally dirty and otherwise inconveniently disposed for operation. The present invention contemplates the use of an oil gauge of the character above set forth, which is to be mounted in the lower opening 18 of the base of the crank case and which will project upwardly to such a height that it will be conveniently accessible at a point above the frame member 15.

The tubular oil gauge body, which comprises the well above referred, is shown at 20. It is closed at its upper end by a cap 21 to which is attached a gauge stick or rod 22. When it is desired to ascertain the level of oil in the crank case, the cap 21 may be seized and the rod 22 withdrawn thereby from the well. An inspection of the rod and of the pipe to which oil adheres thereto will disclose the level of oil in the crank case.

The present invention relates to novel means for supporting the tubular oil gauge body 20 from the crank case in a manner permitting access of oil to its interior and to the rod 22. To this end a centrally apertured plug 24 is provided which is threaded at 25 to fit the opening 18 in the crank case. The central bore or opening 26 communicates with the interior of the crank case when the plug is inserted in opening 18. Plug 24 is provided with an enlarged head 28 which is preferably made hexagonal in order that the plug may readily be manipulated with an ordinary wrench. In one of the facets or side of the hexagonal head 28 is formed a threaded opening 29 adapted to receive the correspondingly threaded shank 30 of a plug 31 somewhat similar to plug 24. The plug 31 is provided with a central aperture 32 which communicates with the opening 26 in plug 24. The plug 31 also has a hexagonal head 33 in one of the side faces in which there is a threaded opening 34 of a size adapted to receive the lower threaded extremity 35 of the tubular oil gauge body 20. It will be seen that the interior of the tubular body 20 is put into communication through openings 34, 32, and 26 with the interior of the crank case of the motor.

From the foregoing it will be apparent that, reduced to its simplest terms, this invention contemplates the use of a pair of centrally bored plugs joined with their axes substantially at right angles and provided with means for receiving the body of the oil gauge and supporting it at right angles to the axis of the second plug. Thus the angular position of the oil gauge body can be varied in two separate planes by regulating the depth to which the plugs 24 and 31 are screwed into place. For example, the angular position of the body 20 in a vertical plane disposed longitudinally of the vehicle will be determined by the extent to which the threaded plug 24 is screwed into the motor crank case. Thereafter the extent to which plug 31 is turned into plug 24 will determine the angular position of the oil gauge body 20 in a plane transverse with respect to the vehicle. A further advantage of the construction illustrated is that the oil gauge body 20 is offset to an extent determined by the length of the shank portion 30 of plug 31. Thus, even though the holes 17 and 18 are in vertical alignment, it will not be necessary for the drain cock 19 to be removed in order to mount the oil gauge 20. By reason of the offset construction above described the oil gauge body will satisfactorily clear the drain cock 19 which may, therefore, be allowed to remain undisturbed.

Ordinarily it is contemplated that when the threaded shank 25 of plug 24 is rigidly secured in place in the crank case by being turned therein to the full extent permitted by the threads, the opening 29 will be disposed at one side of the plug with its axis substantially horizontal. Generally the only adjustments necessary are those made in a plane transverse with reference to the vehicle. When plug 24 is properly positioned therein, plug 31 will be screwed into the opening 29 of the first mentioned plug and care will be taken that as plug 31 approaches the limit of its movement it may be stopped with the opening 34 thereof disposed at an angle adapted to support the oil gauge body 20 in the desired position. Ordinarily the exact angle can readily be found and the plug will permanently retain its adjusted position. It is recognized, however, that an unskilful operator may screw plug 31 too far into the threaded opening 29 at the time of its first insertion so that it may be necessary to unscrew the plug slightly to obtain the desired adjustment. Under such circumstances plug 31 will not be so apt to retain its position of adjustment. It will necessarily be slightly loose in that position. In order, therefore, to guard against any subsequent displacement of the oil gauge body 20 under circumstances such as those outlined above, I preferably provide a plate 38 apertured at 39 to receive the body portion 20 of the oil gauge, and also apertured to receive the securing bolt or stud 14 which is vertically remote from the aperture 18 and holds together flanges 12 and 13 of the crank case. When the plate 38 is in place it serves as a tie to restrain the oil gauge body 20 against any movement about the axis of the threaded opening 29, and thereby secures the device in the desired adjustment regardless of whether plug 31 is threaded tightly into plug 24 or not.

It will be noted that although a lock nut upon the threaded shank 30 of plug 31 would be equally effective in securing the device in adjusted position, the tie 38 is preferable, by reason of the fact that it is more accessible to an operator and can readily be positioned in spite of the limited space available between the crank case and the under pan. It must also be obvious that regardless of the angle at which the opening 18 in the crank case is bored, the character of the fittings disclosed herein is such that the tubular oil guage body can always occupy the same angular position with respect to the crank case and to vehicle frame.

I claim:

1. The combination with an apertured crank case provided with an available stud vertically remote from the aperture therein, of an oil guage body, a hollow fitting adapted to be threadedly engaged with the aperture in the crank case, a second hollow fitting having a tubular stem disposed at right angles to the direction of the hollow in said first mentioned fitting and in threaded connection with said first mentioned fitting whereby to be rotatably adjustable with respect thereto, means for supporting the oil guage body from said second fitting in communication through both of said fittings with the interior of said crank case, and a plate apertured to receive said body and to receive said stud upon the crank case, whereby the oil guage body may be anchored in a desired angular adjustment with reference to the crank case.

2. In a device of the character described, the combination with an apertured container for oil, of a plug threaded into said aperture and provided with a lateral opening, a second plug threaded in said opening and likewise provided with a lateral opening, said plugs being bored to afford communication between said last mentioned opening and said container, and a tubular oil guage body threaded in said last mentioned opening and having a removable guage member associated therewith and projecting from said body into said opening, said body being adjustable in two planes about the axes of the plugs aforesaid.

JOSEPH L. SCHMIDLING.